Nov. 14, 1967  C. H. WALDHAUER, JR  3,352,030
CONTROL APPARATUS
Filed July 29, 1965

TO INDICATOR
OR REGISTER

INVENTOR.
CHARLES H. WALDHAUER JR.
BY
ATTORNEY

3,352,030
CONTROL APPARATUS
Charles H. Waldhauer, Jr., Glendora, Calif., assignor to Honeywell Inc., Minneapolis, Minn., a corporation of Delaware
Filed July 29, 1965, Ser. No. 475,764
8 Claims. (Cl. 35—25)

This invention relates to a simulating and training device and more particularly concerns a training device useful in teaching a trainee the proper technique in aiming a rocket launcher, or other weapon, and indicating whether the trainee has scored a hit, near hit, or miss.

The use of simulators and training devices has reached large proportions, especially in the Armed Forces where large numbers of trainees must be taught within relatively short periods. The training devices should be as simple and inexpensive as possible to realize the savings that are possible with the use of a simulator rather than a real weapon and ammunition.

Most energy detectors (visible or infrared) have a self generated internal noise which is proportional to the area. Therefore, disregarding other factors, a cell with a small area is preferred over one with a large area. Furthermore a small cell is usually less expensive to manufacture. Accordingly it is an object of this invention to provide a training device with an optical system enabling two small cells to be used rather than a small cell and a large cell.

It is another object of this invention to provide a simple training device for teaching a proper aiming technique.

It is a further object to provide a trainer wherein output signals are produced which indicate whether the trainee has scored a hit, near hit, or miss.

It is yet another object to provide apparatus which may be used as an amusement device, for example, in a shooting gallery.

These and other objects will become more apparent after studying the specification in conjunction with the drawings in which.

Figure 1:
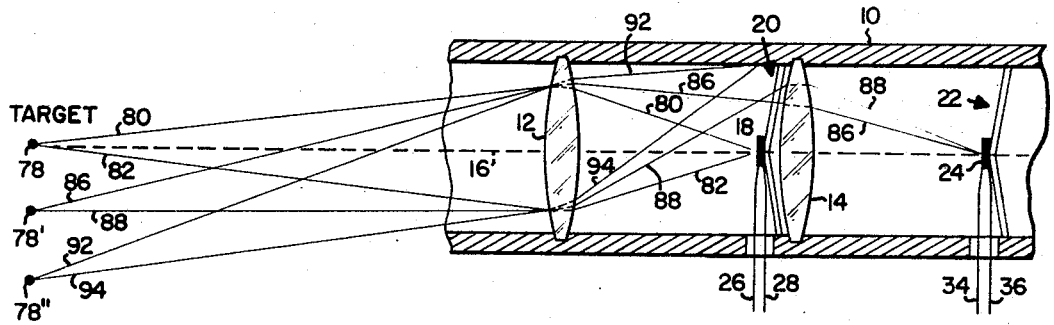
FIGURE 1 is a simplified diagram of a radiation detector.

In describing the preferred embodiment of the invention illustrated in the drawings specific terminology is used for clarity. The invention is not to be limited by the specific terms chosen.

Figure 2:
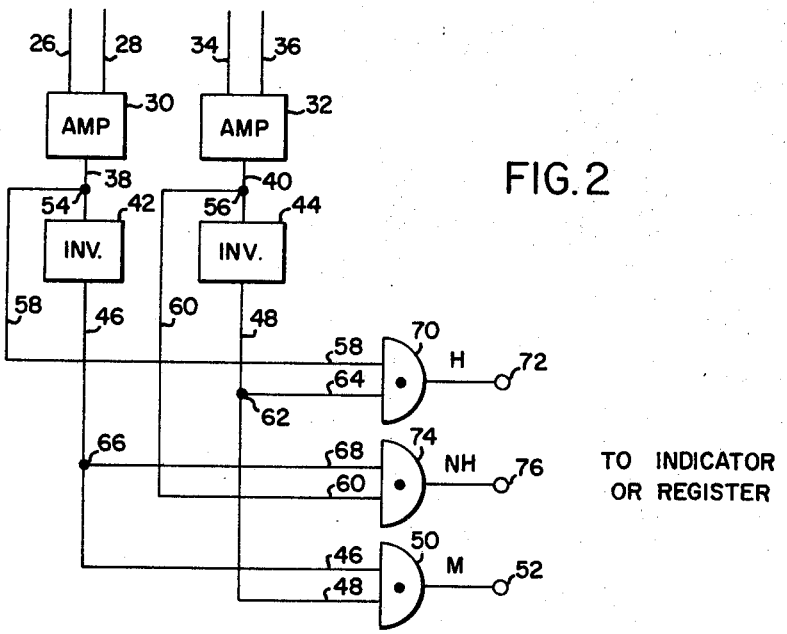
FIGURE 2 is a schematic block diagram of a logic circuit for use with the radiation detector.

The training device, shown in FIGURE 1, includes a tubular mounting structure 10 which may be mounted on or within the training weapon and within which is mounted a pair of converging lenses or focusing elements 12, 14. Lens 12 is an objective lens and lens 14 is a field lens. Mounting structure 10 has a longitudinal axis 16 which lies along a direction associated with proper aiming of the weapon; the ends of mounting 10 are shown cutaway. The principal axes of lenses 12, 14, shown mounted perpendicularly within mounting 10, are coincident with axis 16 although this is not necessary. For example, the principal axes of the lenses may be offset from the axis of tube 10 in teaching the proper lead to be given a moving target. A radiation detector 18 is located at the focal plane of objective lens 12. This detector is attached to the inner wall of mounting structure 10 by a mounting means or metal spider 20. To the right of the first detector 18 and located as close as practical to the focal plane of objective lens 12 is condenser lens 14. It focal length is chosen so that the second detector 24 is imaged on objective 12. Second detector 24 is mounted to the tube 10 by spider 22. A D-C signal, produced when radiation strikes a sensitive region on detector 18, is fed by means of leads 26, 28 to the signal input of an amplifier 30 shown in FIGURE 2. In a similar manner, signals produced when radiation strikes a sensitive region of detector 24 are fed to the signal input of an amplifier 32 in FIGURE 2 by means of leads 34, 36. Detectors 18, 24 may, for example, be infrared detectors or photodetectors. Amplifiers 30, 32 produce binary output signals on leads 38, 40 respectively. The binary signals on leads 38, 40 are fed to the signal inputs of inverters 42, 44 respectively. Inverters 42, 44 provide binary output signals on leads 46, 48 respectively.

Leads 46, 48 are connected to the input circuits of an AND circuit 50 which produces an output signal on line 52 when the proper input signal conditions are met (i.e. positive potential levels on lines 46, 48). Connected to leads 38, 40 at junction points 54, 56 are leads 58, 60 respectively. Connected to lead 48 at a junction 62 is a lead 64 and connected to lead 46 at a junction 66 is a lead 68. Leads 58, 64 are connected to the input circuits of an AND circuit 70 which produces an output signal, when the proper input signal conditions are met, on a lead 72. Leads 68, 60 are connected to the input circuits of an AND circuit 74 which produces an output signal on a lead 76 when the proper input signal conditions are met.

In explaining the general operation assume that a light source 78 is located on the extension of axis 16 as shown in FIGURE 1. Light source 78, randomly movable or movable in a predetermined path, simulates a target. In the specific embodiment shown it is assumed that the weapon is properly aimed when axis 16 extends through the target. Light rays, designated by lines 80, 82, impinge on lens 12, are refracted thereby, and thereafter impinge on detector 18. Detector 18 is mounted on spider 20 such that the radiation sensitive portion of the detector is coincident with the principal focus of lens 12. Light rays impinging on detector 18 cause a D-C signal to be applied to the input of amplifier 30. When a signal is applied to the input of amplifier 30 the potential level at the output thereof, i.e. on line 38, reaches a predetermined positive level which forms the signal input to inverter 42. The output of inverter 42, on line 46, corresponding to a positive potential input, is a zero potential level. Alternatively, the absence of a signal input to amplifier 30 results in a zero potential level on line 38 and a positive potential level on line 46.

When light source 78 is located on axis 16, light from the source impinges only on detector 18. Under this condition light from source 78 does not impinge on detector 24, thus the output of amplifier 32, on line 40, is a zero potential level, and the output of inverter 44, on line 48, is a positive potential level. Therefore, AND circuit 70 has a positive potential level at both inputs, line 58 and line 64 (which is connected to line 48 at junction 62), and output line 72 assumes a positive potential level. The positive potential level on line 72 indicates that mounting means 10 was properly aimed with respect to source 78 resulting in a hit. Various kinds of visual indicators (not shown) might be connected to output line 72 (also lines 76, 52), for example, lights, relays, etc.

Now assume that light source 78 takes a new position (the source being designated 78' in this new position) which is slightly laterally displaced from axis 16. In such a situation the training weapon is not quite properly aimed and a near miss would result. Light rays emanating from source 78', indicated by lines 86, 88, impinge on lens 14 rather than on detector 18. Lens 14 refracts rays 86, 88 causing them to impinge upon detector 24. Light impinging on detector 24 causes a D-C signal to be applied to the input of amplifier 32 resulting in a positive potential level on line 60. Alternately, lack of a signal input to amplifier 30 results in a positive potential level appearing on line 46 (the output of inverter 42). Thus, AND circuit 74 has positive potentials present on both input lines and a positive potential is produced on output line 76, indicative of a near hit or near miss.

A complete miss is registered under the following conditions. Source 78 has a position laterally displaced a fairly large distance from axis 16 (the source being designated 78″ at this position), indicating that the training weapon is badly aimed. Light rays, indicated by lines 92, 94, are shown emanating from source 78″. Rays 92, 94 impinge on lens 12 and are refracted through such angles that they do not impinge on either detector 18 or lens 14 and consequently miss detector 24 also. Hence, amplifiers 30, 32 do not receive input signals and the outputs of inverters 42, 44 (on lines 46, 48 respectively) are at a positive potential. Accordingly, AND circuit 50 is activated, producing a signal on output line 52 indicative of a complete miss.

Triggering can be accomplished in a variety of ways. The light source 78 can be turned on in response to the trainee firing the training device, or a shutter can be mounted in front (to the left) of lens 12, which opens in response to a firing.

The device has the advantage of being simple and relatively inexpensive. In addition to use as a strict training device, it could be used in a game or amusement device. In this form, mounting means 10 represents the barrel of the weapon, which could in turn be swivel mounted on a stand, or attached to a stock and aimed like a rifle. In addition to light indicators, a scoring register, for example, a cumulative counter, could be actuated by the AND circuit outputs.

It should be understood that the form of the invention illustrated and described is merely a preferred embodiment, and that possible other forms, utilizing technically equivalent elements, exist which are within the scope of the invention. For example, source 78 need not necessarily be a visible light source but may be invisible, for example, infrared or ultraviolet light. The axes of the lenses have been described as correctly aimed if they intersect the target. However, in training on moving targets it may be desirable to "lead" the target. This may be accomplished by placing the detector off axis by a desired amount or by skewing the optical system with respect to the weapon upon which it is mounted.

Having thus described my invention, I claim:

1. Apparatus for use in a training system, comprising:
   a movable target means, comprising a source of radiation;
   a converging objective lens and a converging field lens, each having a principal axis and principal focus;
   tubular means, having a longitudinal axis, said objective and field lenses mounted therewithin perpendicular to the longitudinal axis, the principal axes of said lenses coincident with the longitudinal axis and the principal focus of the objective lens lying at a point on the longitudinal axis between the objective and field lenses;
   a first radiation detector mounted to intercept radiation from said source refracted by said objective lens and impinging on said detector at the principal focus of said objective lens;
   a second radiation detector mounted to intercept radiation from said source which is refracted by said objective lens, misses said first detector and impinges on said field lens and is refracted thereby; and
   indicating means, receiving signals produced by said detectors when radiation impinges thereon, and producing output signals indicative of a first condition when radiation impinges on said first detector, and a second condition when radiation impinges on said second detector, said indicating means also producing a signal indicative of a third condition when radiation is not impinging on either detector.

2. The apparatus of claim 1 wherein the focal length of the field lens is chosen such that the second detector is imaged on the objective lens.

3. Training apparatus for use with a movable source of radiation serving as a target comprising, in combination:
   a converging objective lens and a converging field lens, each having a principal focus;
   tubular means, having a longitudinal axis, said objective and field lenses mounted therewithin perpendicular to the longitudinal axis, the principal axes of said lenses coincident with the longitudinal axis and the focus of the objective lens lying on the longitudinal axis at a point between the objective and field lenses;
   a first radiation detector, mounted to intercept radiation from said source refracted by said objective lens and impinging on said detector at the principal focus of said objective lens; and
   a second radiation detector mounted to intercept radiation from said source, which is refracted by said objective lens which misses said first detector and which impinges on and is refracted by said field lens.

4. The apparatus of claim 3 wherein the focal length of the field lens is selected such that the second detector is imaged on the objective lens.

5. The apparatus as defined in claim 3 wherein the outputs of the first and second detectors are used as inputs to logical circuitry the outputs of which indicate the state of said detectors.

6. Apparatus for use in a hit, near hit, miss indicating training device comprising, in combination:
   radiation impervious structure;
   a first focusing means, having a principal axis and focus, mounted within said structure;
   a first radiation detecting means, mounted to intercept radiation focused by said first focusing means at the principal focus thereof;
   a second focusing means, having a principal axis and focus, mounted within said structure, the axes of said first and second focusing means being coincident, the principal focus of the first focusing means being between it and the second focusing means; and
   second detector means mounted to intercept radiation refracted by said second focusing means, any radiation being refracted by the second focusing means necessarily first being refracted by the first focusing means.

7. Optical apparatus comprising, in combination:
   first and second converging lenses aligned along an optical axis, each lens having a principal focus, the focus of the first lens lying on the axis at a point between the lenses; and
   first and second radiation detectors corresponding to the lenses and mounted at the principal foci, the radiation normally detected by the first detector impinging on and refracted by the first lens and the radiation normally detected by the second detector impinging on and refracted by the second lens subsequent to its impingement on and refraction by the first lens.

8. A training device comprising, in combination:
   a substantially point-like source of light;
   first and second converging lenses aligned along an optical axis, the focus of the first lens lying on the axis between the first and second lenses;
   a first photodetector mounted at the focus of the first lens to intercept light rays emanating from said source, refracted by said first lens when said source is located on the optical axis; and
   a second photodetector mounted at the focus of the second lens to intercept light rays emanating from said source, refracted by said first and second lenses when said light source is located at a point slightly laterally displaced from the optical axis, said lens and detectors intermounted so that light is not intercepted by either said first or second detector if the source is substantially laterally displaced from the optical axis.

References Cited

UNITED STATES PATENTS

| | | | |
|---|---|---|---|
| 2,877,354 | 3/1959 | Fairbanks et al. | 250—203 |
| 2,939,938 | 6/1960 | Ravich | 219—20 |
| 2,961,545 | 11/1960 | Astheimer et al. | 250—203 |
| 3,012,469 | 12/1961 | Clayborne | 88—14 |
| 3,083,474 | 4/1963 | Knapp | 35—25 |
| 3,271,032 | 9/1966 | Rabinowitz et al. | 273—101.1 |

EUGENE R. CAPOZIO, *Primary Examiner.*

R. W. WEIG, *Assistant Examiner.*